United States Patent [19]

Koop et al.

[11] Patent Number: 4,861,437
[45] Date of Patent: Aug. 29, 1989

[54] METHOD OF MANFACTURING A MOULD AND PROVIDING IT WITH A BACKING AND MOULD MANUFACTURED ACCORDING TO THE INVENTION

[75] Inventors: Hermann Koop, Ronnenberg; Claudia Pechtheiden-Meier, Hanover, both of Fed. Rep. of Germany

[73] Assignee: Philips & DuPont Optical Company, New York, N.Y.

[21] Appl. No.: 223,466

[22] Filed: Jul. 21, 1988

[30] Foreign Application Priority Data

Jul. 30, 1987 [DE] Fed. Rep. of Germany ....... 3725231

[51] Int. Cl.[4] ............................................... C25D 1/10
[52] U.S. Cl. ......................................................... 204/5
[58] Field of Search ............................................. 204/5

[56] References Cited

U.S. PATENT DOCUMENTS 4,124,672 11/1978 Jarson ..................................... 204/5

Primary Examiner—T. M. Tufariello
Attorney, Agent, or Firm—Norman N. Spain

[57] ABSTRACT

In a method of manufacturing a mould and providing it with a backing, the mould is derived from a parent information carrier by an electroforming process, after which electroforming process and prior to its separation from the parent information carrier the mould is provided with a backing. In order to reduce the cycle times and to improve the mechanical stability, the backing is formed by a UV-curable lacquer which is applied in liquid form and is distributed over the back of the mould, which is subsequently cured by exposure to ultraviolet light.

12 Claims, 1 Drawing Sheet

METHOD OF MANFACTURING A MOULD AND PROVIDING IT WITH A BACKING AND MOULD MANUFACTURED ACCORDING TO THE INVENTION

BACKGROUND OF THE INVENTION

The invention relates a.o. to a method of manufacturing a mould and providing the mould with a backing, which mould after at least one further multiplication step serves for manufacturing disc-shaped information carriers. Further the mould is derived from a parent information carrier in an electroforming process in which an information structure formed in the parent information carrier is transferred to the mould, after which electroforming process and prior to its separation from the parent information carrier the mould is provided at its back with a backing which serves for mechanical reinforcement.

FR-PS 10 12 660 describes a method enabling thin metallic objects to be mechanically reinforced with a backing. These objects may be, for example, positive or negative moulds required in the fabrication of audio discs in the multiplication steps from the master to the finished plastics disc record. If, for example, an electroformed copy is to be derived from a negative mould the information side of the negative is first provided with a copper layer in an electroforming process. For reinforcement purposes the copper layer is subsequently provided with a heat-curable synthetic resin coating in accordance with FR-PS 10 12 660. The coating is subsequently covered with a thermoplastic material. This method consequently involves the deposition of a plurality of layers, which is a disadvantage for the production process. Moreover, heat-curable synthetic resins cannot be cured in a stable manner. This is because right from the beginning of the curing process a thin surface layer has already essentially cured. The underlying layers then cannot cure correctly and irregularities are formed, which may disturb the copper layer during subsequent multiplication processes. Moreover, such a synthetic resin coating does not have an adequate mechanical stability.

SUMMARY OF THE INVENTION

One of the objects of the invention is to provide a simple method of manufacturing a mould and providing it with a backing, which method does not have the above drawbacks.

According to the invention this object is achieved in that the backing is provided in the form of a UV-curable lacquer which is applied in liquid form, which is distributed over the back of the mould, and which is subsequently cured by exposure to ultraviolet light.

Thus, a mould is now backed by means of a UV-curable lacquer applied in a single layer. The principal advantage is that the UV-curable lacquer cures uniformly when exposed to UV light, so that the backing does not exhibit inhomogeneities which could disturb a subsequent multiplication process. The use of a UV-curable lacquer in the method of the invention has the advantage that the curing time is short, so that backings can be produced with short cycle times. The requirements imposed on the purity of the UV lacquer probably are not stringent, because it is merely applied to the back of the mould and minor irregularities will probably not disturb the metal layer.

When a mould is thus provided with a backing a high mechanical stability is obtained. As a result of this, the metal layer of the mould, which layer generally consists of nickel, need have only a small thickness. This means that the electroforming process, in which the metal layer is deposited, can be shortened. This yields a further reduction of the production cycle.

DETAILED DESCRIPTION OF THE INVENTION

Figure 1:
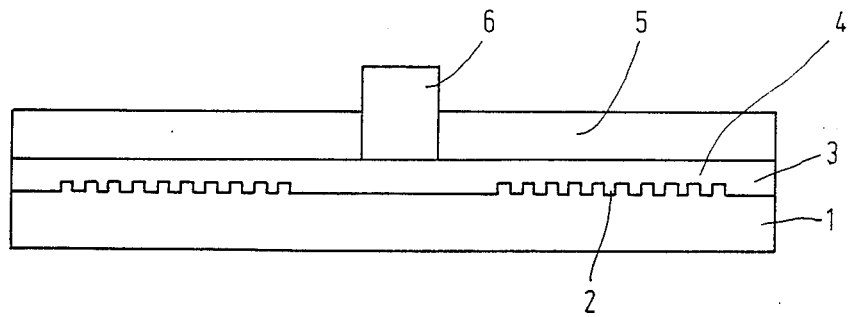
FIG. 1 is a cross-sectional view of a first embodiment of an assembly of a parent information carrier and a mould according to the invention.

For a better understanding of the invention the invention will now be described in greater detail.

The best results are probably to be expected if the mould derived from the parent information carrier and provided with a backing is not separated from the parent information carrier until the mechanical backing, i.e. the UV-curable lacquer, has been applied and has cured. This will minimize the risk of damaging the mould.

The parent information carrier may be a mould or a master. In the case of optically readable disc shaped information carriers, masters may be glass discs provided with a photoresist layer formed with pits representing the information. This information structure is to be transferred to the mould. For this purpose the photoresist layer with the pits formed therein is provided with a thin silver layer, which is necessary to render the surface of the master electrically conductive for the electroforming process. In a subsequent electroforming process a thin nickel layer is then grown on said silver layer.

A mould provided with the backing in accordance with the invention requires only a nickel layer having a thickness smaller than 0.2 mm. A UV-curable lacquer is deposited on this thin nickel layer and distributed. Subsequently, the UV-curable lacquer is cured by means of ultraviolet light. It is found to be advantageous if the lamp energy is approximately 80 to 120 W/cm lamp length. The light emitted by the lamp should have a wavelength of 200 to 600 nm. If these parameters are selected as specified above, a curing time of approximately 1 to 5 seconds is obtained. This means a substantial reduction of the cycle time in comparison with the known method.

In a further embodiment of the invention the UV-curable lacquer is applied in such a quantity that after distribution and curing a layer having a thickness of 0.2 to 3 mm is obtained. Such a layer thickness of the backing is found to be advantageous because it guarantees a satisfactory mechanical stability and requires a curing cycle time below 5 s for the lacquer, which is very short.

In a further embodiment of the invention the liquid UV-curable lacquer is applied to the back of the mould substantially in the center of the mould and is distributed by rotating the mould. This method of applying a lacquer on a disc-shaped information carrier has proved to be effective in providing optically readable disc-shaped information carriers with protective coatings and can also be used advantageously in the inventive method, because the lacquer will be distributed uniformly on the back of the mould as it is rotated, without the need for further tools which could damage the mould.

In further embodiments of the invention the UV-curable lacquer is distributed on the back of the mould be means of a die, or the UV-curable lacquer is applied to the back of the mould by a casting process. These variants of the method are advantageous in cases in which during production of the mould it is not possible to rotate the mould on account of the available equipment. These methods also guarantee an adequately uniform distribution of the UV-curable lacquer.

In a further embodiment of the invention the mould is provided with an electrical contact member before the UV-curable lacquer is applied. Generally, a further replica is to be made from the mould by means of an electroforming process. For this purpose it is necessary that electrical contact can be made with the nickel layer of the mould. For this purpose the nickel layer of the mould is provided with an electrical contact member prior to application of the UV-curable lacquer. Generally, this contact member is arranged in the center of the mould, but it may also be arranged at the periphery. As an alternative it is possible, before application of the UV-curable lacquer, not to mount the electrical contact member itself but a kind of dummy, which after curing of the UV-curable lacquer is removed and is replaced by the electrical contact member.

In a further embodiment of the inventive method, after application of the liquid UV-curable lacquer, a plastics disc which is transparent to UV radiation is pressed onto said lacquer, and subsequently the UV-curable lacquer is cured by exposure to ultraviolet light through the plastics disc. In this way the nickel layer of the mould is reinforced both by a UV-curable layer and a plastics disc pressed onto said layer, said disc and the UV-curable layer forming a firm bond after curing. This results in a further improvement of the mechanical stability of the mould, improving its suitability for mechanical multiplication processes. An additional advantage is that the layer of UV-curable lacquer, which is exposed to ultraviolet light through the plastics disc, can be thinner because the mechanical stability is mainly provided by the plastics disc.

In a further embodiment of the invention, if the backing is formed by means of UV-curable lacquer and a plastics disc, the liquid UV-curable lacquer is applied in such a quantity that a layer having a thickness $\leq 0.1$ mm is obtained after distribution and curing. A layer of this thickness is found to be advantageous because it can be cured rapidly and it guarantees a satisfactory bond between the actual mould and the plastics disc pressed onto the layer of UV-curable lacquer.

In a further embodiment of the invention, prior to application of the UV-curable lacquer, the mould is provided with an electrical contact member at whose location the subsequently mounted plastics disc has a hole. If the backing comprises a plastics disc in addition to the UV-curable lacquer, this method provides an electrical contact member for a subsequent electroforming process. Before application of the UV-curable lacquer the mould is provided with the electrical contact member at the location where the subsequently mounted plastics disc exhibits a hole.

Figure 2:
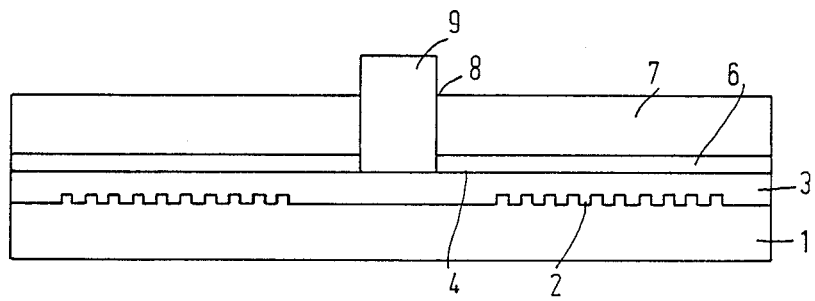
FIG. 2 is a cross-sectional view of an additional embodiment of an assembly of a parent information carrier and a mould according to the invention.

Two embodiments of the invention will now be described in detail, by way of example, with reference to the accompanying drawing. In the drawing:

FIG. 1 shows a parent information carrier and a mould derived from this carrier by means of an electroforming process and provided with a backing of a UV-curable lacquer, and FIG. 2 shows an arrangement similar shown to that in FIG. 1, in which the mould is provided with a plastics disc in addition to the lacquer layer.

FIG. 1 shows a parent information carrier 1 carrying an information structure 2 on one of its sides. This information structure is to be transferred to a mould.

Multiplication steps are customary in the manufacture of disc records. From a master the stampers are derived in one or more multiplication steps, generally by means of electroforming. Generally, multiplication proceeds in such a way that in a plurality of electroforming processes a negative mould is derived from a master disc, from which negative a positive mould is derived, from which positive further negatives or stampers are derived by means of which the pressings are made. In all these cases the method in accordance with the invention can be used advantageously, because it shortens the electroforming processes and it guarantees a satisfactory mechanical stability of the moulds thus formed.

Instead of the mould as shown in FIG. 1 a master may be provided, which master may consist of a glass disc provided with a photoresist layer carrying the information structure. Since the surface must be conductive in view of a subsequent electroforming process, the photoresist layer is provided with an additional silver layer.

The parent information carrier 1 shown in FIG. 1 is a mould which consists, for example, of nickel and which on one of its sides carries the information structure to be transferred to a further mould. For this purpose, the mould side carrying the information structure 2 is provided with a further nickel layer 3, which exhibits the information structure 2 of the parent information carrier in negative form. At its back 4 the mould 3 is provided with a backing 5 of a UV-curable lacquer. This lacquer is applied to the back 4 of the mould 3, for example, by applying a lump of lacquer, which is subsequently distributed over the surface 4 of the mould 3 by rotating the mould. In the center of the mould 3 a contact member 6 is arranged. The contact member 6 is mounted before the UV-curable lacquer is applied to the mould, so that no UV-curable lacquer is situated at the location of the contact member 6.

After application of the still liquid UV-curable lacquer to the back 4 of the mould 3 the lacquer is cured by means of ultraviolet light. The mould 3 is not separated from the mould 1 until the UV-curable lacquer has cured. This is easy because the UV-curable lacquer has formed a firm bond with the back 4 of the mould 3. The two moulds are not separated until the UV-curable lacquer has cured to prevent damage to the mould.

Since the mould 3 is provided with a backing 5 in the form of the UV-curable lacquer the mould 3, which is generally made of nickel, can be thin. As a result of this, the electroforming process may be shortened considerably.

It is to be noted that the Figure is not to scale. The mould 3 (and, as the case may be, the mould 1) may have a substantially smaller thickness than the backing 5.

It is found to be advantageous if the backing has a layer thickness of substantially 0.2 to 3 mm. If for curing a lamp energy of 80 to 120 W/cm$^2$ lamp length is employed, the curing time for the UV-curable lacquer will be only 1 to 5 s for a lamp operating in the wavelength range from 200 to 600 nm.

The mould 1 may itself be a mould manufactured by the invention method and provided with a backing.

FIG. 2 shows a parent information carrier 1 having an information layer 2, on which a mould 3 is formed in an electroforming process. The back 4 of this mould 3 has been provided with a layer 6 of an UV-curable lacquer in accordance with the method, but here this layer is thinner than in the embodiment shown in FIG. 1. This is possible because, prior to curing of the layer 6 of UV-curable lacquer a transparent plastics reinforcement disc 7 is pressed onto this layer and forms a firm bond with the lacquer, thereby providing the required additional reinforcement. In its center the plastics disc 7 has a hole 8 which is engaged by a contact member 9, which is in electrical contact with the mould 3, which generally consists of nickel.

After the transparent plastics disc 7 has been pressed onto the layer 6 of UV-curable lacquer, the lacquer is exposed to ultraviolet light through the plastics disc 7. The UV-curable lacquer can be distributed by exerting pressure on the plastics disc. Since, in addition to a layer of UV-curable lacquer this second embodiment comprises a transparent backing disc, which provides a further reinforcement of the mould, it is adequate if the UV-curable lacquer layer has a thickness $\leq 0.1$ mm.

If an electrolyte-resistant and temperature-resistant electrically insulating material is employed for the backing, this has the advantage that no deposits can be formed on the back during electroforming. This enables a controlled nickel deposition of well-defined thickness at the front of the mould to be obtained without the back being provided with a special shielding.

The mechanically stable backing in accordance with the invention guarantees an absolutely plane mould surface. This ensures a well-defined and constant distance to the anode over the entire surface area during electroforming. Consequently, a reproducible and well-defined thickness of the nickel layer is guaranteed within narrow tolerances. Unevennesses on the deposited nickel surface are levelled by the backing. Unevennesses or small particles on holding devices, for example vacuum chucks, for moulds provided with a backing no longer result in the information structure on the mould being disturbed, because they penetrate into the backing and are evened out.

What is claimed is:

1. A method of manufacturing a mould (2) and providing said mould with a backing, which mould after at least one further multiplication step serves for manufacturing disc-shaped information carriers (1), and is derived from a parent information carrier (1) in an electroforming process in which an information structure (2) formed in the parent information carrier (1) is transferred to the mould (3), after which electroforming process and prior to its separation from the parent information carrier (1) the mould is provided at its back (4) with a backing (5) which serves for mechanical reinforcement, in which method the backing (5) is formed in the form of a UV-curable lacquer which is applied in liquid form, which is distributed over the back (4) of the mould (3), and which is subsequently cured by exposure to ultraviolet light.

2. A method as claimed in claim 1, in which the UV-curable lacquer is applied in such a quantity that after it is distributed and cured a layer having a thickness of 0.2 to 3 mm is obtained.

3. A method as claimed in claim 1, in which the liquid UV-curable lacquer is applied to the back (4) of the mould (3) substantially in the center of the mould and is distributed by rotating the mould (3).

4. A method as claimed in claim 1, in which the UV-curable lacquer on the back (4) of the mould (3) is distributed by means of a doctor blade.

5. A method as claimed in claim 1, in which the UV-curable lacquer on the back (4) of the mould (3) is distributed by means of a die.

6. A method as claimed in claim 1, wherein the UV-curable lacquer is applied to the back (4) of the mould (3) by a casting process.

7. A method as claimed in claim 1, in which the mould is provided with an electrical contact member (6) prior to application of the UV-curable lacquer.

8. A method as claimed in claim 1, wherein after application of the liquid UV-curable lacquer a plastics disc (7) which is transparent to ultraviolet radiation is pressed onto said lacquer and subsequently the UV-curable lacquer is cured by exposure to ultraviolet light through the plastics disc (7).

9. A method as claimed in claim 8, wherein the liquid UV-curable lacquer is applied in such a quantity that a layer having a thickness $\leq 0.1$ mm is obtained after distribution and curing.

10. A method as claimed in claim 8, wherein prior to application of the UV-curable lacquer the mould is provided with an electrical contact member (9) at whose location the subsequently mounted plastics disc (7) has a hole (8).

11. A method as claimed in claim 1, wherein an electrolyte-resistant and temperature-resistant electrically insulating material is used for the backing.

12. A mould manufactured by means of a method as claimed in claim 1.

* * * * *